US006977682B2

(12) United States Patent
Mizuno et al.

(10) Patent No.: US 6,977,682 B2
(45) Date of Patent: *Dec. 20, 2005

(54) SOLID-STATE IMAGING DEVICE

(75) Inventors: Seiichiro Mizuno, Hamamatsu (JP); Hiroo Yamakawa, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 760 days.

This patent is subject to a terminal disclaimer.

(21) Appl. No.: 09/725,251

(22) Filed: Nov. 29, 2000

(65) Prior Publication Data

US 2001/0008422 A1   Jul. 19, 2001

Related U.S. Application Data

(63) Continuation of application No. PCT/JP99/03675, filed on Jul. 7, 1999.

(30) Foreign Application Priority Data

Jul. 8, 1998 (JP) ................................ P10-193047

(51) Int. Cl.⁷ ...................... H04N 5/217; H04N 5/335
(52) U.S. Cl. ....................................... 348/241; 348/294
(58) Field of Search ..................... 250/208.1; 348/294, 348/301, 302, 307–311, 315–317, 319–323, 348/241

(56) References Cited

U.S. PATENT DOCUMENTS

| | | | | |
|---|---|---|---|---|
| 4,827,145 A | * | 5/1989 | Arques | 378/98.8 |
| 4,996,413 A | * | 2/1991 | McDaniel et al. | 250/208.1 |
| 5,187,583 A | * | 2/1993 | Hamasaki | 348/250 |
| 5,731,578 A | * | 3/1998 | Mizuno | 250/208.1 |
| 5,796,431 A | * | 8/1998 | Yonemoto | 348/308 |
| 6,075,564 A | * | 6/2000 | Mizuno | 348/294 |
| 6,169,440 B1 | * | 1/2001 | Liu | 327/337 |
| 6,201,573 B1 | * | 3/2001 | Mizuno | 250/208.1 |

FOREIGN PATENT DOCUMENTS

| | | | |
|---|---|---|---|
| JP | 2-268063 | 11/1990 | .......... H04N 5/335 |
| JP | 4-154282 | 5/1992 | .......... H04N 5/335 |
| JP | 4-290081 | 10/1992 | .......... H04N 5/335 |
| JP | 09 046597 | 2/1997 | .......... H04N 5/335 |
| JP | 9-46597 | 2/1997 | .......... H04N 5/335 |
| JP | 09 051476 | 2/1997 | .......... H04N 5/335 |
| JP | 9-51476 | 2/1997 | .......... H04N 5/335 |
| JP | H09-051476 A | 2/1997 | |
| JP | 10-28240 | 1/1998 | .......... H04N 5/335 |
| JP | 10 028240 | 1/1998 | .......... H04N 5/335 |

* cited by examiner

Primary Examiner—Thai Tran
Assistant Examiner—Timothy J. Henn
(74) Attorney, Agent, or Firm—Drinker Biddle & Reath LLP

(57) ABSTRACT

A current signal corresponding to the amount of incident light detected by a photoelectric conversion device 13 is inputted to and integrated by an integrator circuit 30, whereby a voltage signal is outputted from the integrator circuit 30. When a switch 40 is closed, the voltage signal outputted from the integrator circuit 30 is inputted to a capacitor 51 of a variable capacity integrator circuit 50, a change of the voltage signal is inputted to an amplifier 52, and an electric charge corresponding to the change of voltage signal and the capacity value of a variable capacity part 53 flows into the variable capacity part 53. The capacity value of the variable capacity part 53 is controlled by a comparator 60 and a capacity control section 70 such that the value of integrated signal outputted from the variable capacity integrator circuit 50 coincide with a reference value. The capacity control section 70 outputs a first digital signal corresponding to the capacity value of the variable capacity part 53. As a consequence, a solid-state imaging device which is excellent in S/N ratio, yields no offset errors even when its amplifier have offset fluctuations, and has a small circuit scale is obtained.

4 Claims, 7 Drawing Sheets

SOLID-STATE IMAGING DEVICE

RELATED APPLICATION

This is a continuation-in-part application of application Ser. No. PCT/JP99/03675 filed on Jul. 7, 1999, now pending.

BACKGROUND OF THE INVENTION

1. Field of the Invention

The present invention relates to a MOS type solid-state imaging device which can pickup two-dimensional light images.

2. Related Background Art

In the mainstream of solid-state imaging devices used in various fields such as home video are those of a charge-coupled device (CCD) type having a high sensitivity and excellent characteristics such as low noise. In special fields, however, MOS type solid-state imaging devices excellent in their efficiency of transferring electric charges generated upon incident light have been in use.

Among the MOS type solid-state imaging devices, those capable of picking up two-dimensional light images have conventionally employed a system in which a number of photodetectors two-dimensionally arranged on a semiconductor chip are provided with their discrete amplifiers and A/D converters, respective current signals outputted from the individual photodetectors are amplified by the amplifiers to yield voltage signals, the resulting voltage signals are converted into digital signals by the A/D converters, and thus obtained digital signals are outputted. In recent years, however, there have been proposed attempts in which, while amplifiers and A/D converters are mounted on the same chip with a photodetector array, the circuit configuration system is altered, in order to reduce the size of the device while taking advantage of being a MOS type.

For example, the solid-state imaging device disclosed in Japanese Patent Application Laid-Open No. HEI 9-51476 is one in which integrator circuits and the like are mounted on the same chip with a photodetector array so as to correspond to respective columns of the photodetector array, and the integrator circuits and the like amplify and A/D-convert the current signals outputted from the photodetectors. Such a configuration attempts to suppress the increase in scale of the circuit mounted on the chip, the increase in chip area, and the increase in power consumption of the chip.

SUMMARY OF THE INVENTION

The conventional example mentioned above, however, is problematic in that the S/N ratio upon amplification is not favorable, since it does not carry out signal processing for eliminating the noise occurring upon conversion in which current signals are integrated by the integrator circuits and the like so as to yield voltage signals. Also, since no countermeasures are taken against offset fluctuations inherent in amplifiers which are constituent circuits of the integrator circuits, there is a possibility of slight offset errors occurring in the result of A/D conversion.

In order to overcome the above-mentioned problems, it is an object of the present invention to provide a solid-state imaging device which is excellent in S/N ratio, yields no offset errors even when its amplifiers have offset fluctuations, and has a small circuit scale.

For achieving the above-mentioned object, the solid-state imaging device in accordance with the present invention comprises: (1) a photodetector including a photoelectric conversion device for converting an incident optical signal into a current signal and a switch for outputting the current signal to an output terminal; (2) an integrator circuit for inputting and integrating the current signal outputted from the output terminal of the photodetector, so as to output a voltage signal to an output terminal thereof; and (3) a signal processing unit for processing the voltage signal from the integrator circuit; the signal processing unit comprising: (3a) a variable capacity integrator circuit having a capacitor for inputting the voltage signal outputted from the output terminal of the integrator circuit, an amplifier for inputting to an input terminal the voltage signal outputted from the capacitor, a variable capacity part, disposed between the input and output terminals of the amplifier, having a variable capacity value, and a reset switch disposed between the input and output terminals of the amplifier, the variable capacity integrator circuit outputting from the output terminal of the amplifier an integrated signal having a value corresponding to a change of the voltage signal inputted to the capacitor; (3b) a comparator for inputting the integrated signal outputted from the variable capacity integrator circuit, comparing the value of the integrated signal with a reference value in terms of magnitude, and outputting a comparison result signal; and (3c) a capacity control section for inputting the comparison result signal outputted from the comparator, controlling the capacity value of the variable capacity part according to the comparison result signal, and outputting a first digital signal corresponding to the capacity value of the variable capacity part when it is determined according to the comparison result signal that the value of the integrated signal and the reference value coincide with each other at a predetermined resolution.

First, according to this solid-state imaging device, as its initial state, the switch of the photodetector is open, whereas the integrator circuit is in its reset state. Also, the reset switch is closed in the variable capacity integrator circuit so as to reset the latter, whereby the capacity value of the variable capacity part is initially set. Thereafter, the integrator circuit is brought into a state capable of integration, and the reset switch in the variable capacity integrator circuit is opened after the lapse of a predetermined time therefrom. Then, when the switch of the photodetector is closed, the current signal corresponding to the amount of incident light detected by the photoelectric conversion device is inputted to and integrated by the integrator circuit, whereby a voltage signal is outputted from the integrator circuit. The voltage signal outputted from the integrator circuit is inputted to the capacitor of the variable capacity integrator circuit, a change of the voltage signal inputted to the capacitor is inputted to the amplifier, and the electric charge corresponding to the change of the voltage signal and the capacity value of the variable capacity part flows into the variable capacity part. As a consequence, an integrated signal having a value corresponding to the change of the voltage signal inputted to the capacitor is outputted from the variable capacity integrator circuit.

The integrated signal outputted from the variable capacity integrator circuit is inputted to the comparator, which compares the value of the integrated signal with a reference value in terms of magnitude, whereby a comparison result signal as a result of the comparison is outputted from the comparator. The comparison result signal is inputted to the capacity control section, which controls the capacity value of the variable capacity part according to the comparison result signal. Namely, a feedback loop constituted by the variable capacity integrator circuit, comparator, and capacity control section repeatedly sets the capacity value of the variable capacity part and compares the value of integrated signal and the reference value in terms of magnitude until the capacity control section determines that the value of integrated signal and the reference value coincide with each other at a predetermined resolution. If the capacity control section determines that the value of integrated signal and the reference value coincide with each other at a predetermined resolution then a first digital signal corresponding to the capacity value of the variable capacity part is outputted from the capacity control section. Namely, the signal processing unit including the variable capacity integrator circuit, comparator, and capacity control section has a CDS (Correlated Double Sampling) function for eliminating offset errors and an A/D-converting function for converting analog signals into digital signals.

Using thus constructed signal processing unit having a CDS function and A/D-converting function makes it possible to realize improvement in S/N ratio and suppression of offset errors with a simple circuit configuration. Also, it is possible to attain a smaller total circuit scale, and a smaller chip size as a consequence.

DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

(First Embodiment)

Figure 1:
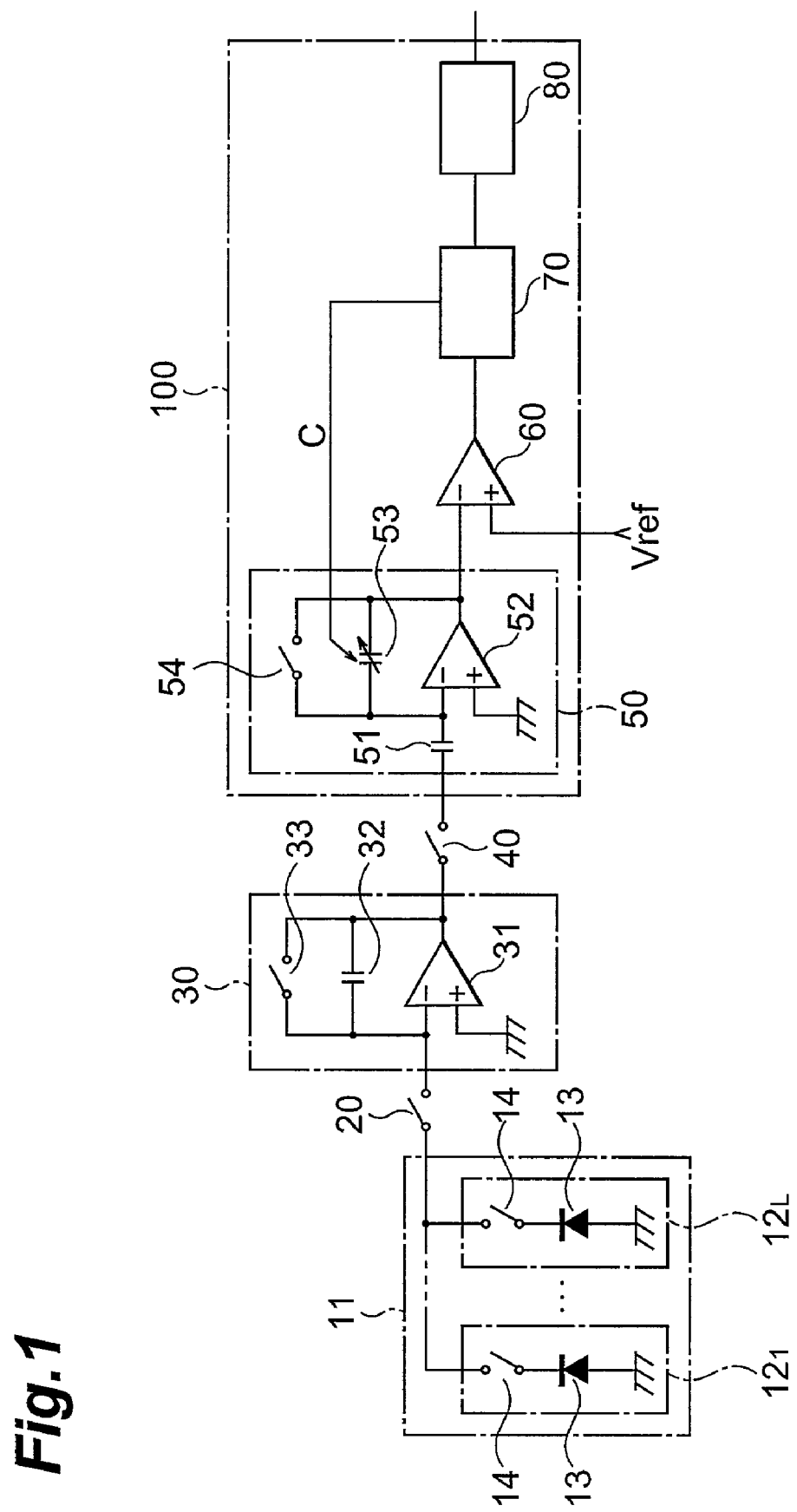
FIG. 1 is a schematic circuit diagram of the solid-state imaging device in accordance with a first embodiment.

To begin with, a first embodiment of the solid-state imaging device in accordance with the present invention will be explained. FIG. 1 is a schematic circuit diagram of the solid-state imaging device in accordance with the first embodiment. This drawing shows the configuration of an individual column of a two-dimensionally arranged photodetector array or the configuration of a one-dimensionally arranged photodetector array. In the following, the configuration of an individual column of a two-dimensionally arranged photodetector array will be explained, and the individual column of the photodetector array will be referred to as a vertical photodetective section 11.

In the vertical photodetective section 11, photodetectors $12_i$ (i=1 to L) are arranged. Each of the photodetectors $12_i$ (i=1 to L) comprises a photoelectric conversion device 13 and a switch 14. Each of the respective photoelectric conversion devices 13 of the photodetectors $12_i$ (i=1 to L) is, for example, a photodiode having a grounded anode terminal, and outputs a current signal corresponding to its detected incident optical signal. Each of the respective switches 14 of the photodetectors $12_i$ (i=1 to L) opens and closes according to a vertical scanning signal, so as to input a current signal outputted from the cathode terminal of its corresponding photoelectric conversion device 13 and output this signal to a commonly connected signal output terminal. Two or more switches 14 of the photodetectors $12_i$ (i=1 to L) would not open at the same time.

A switch 20 inputs to its input terminal the current signal outputted from the common signal output terminal of the vertical photodetective section 11 and, when closed, outputs the current signal to its output terminal.

An integrator circuit 30 inputs the current signal outputted from the output terminal of the switch 20, integrates the current signal, and outputs the resulting voltage signal to its output terminal. The integrator circuit 30 comprises a charge amplifier 31, a capacitor 32, and a reset switch 33. The charge amplifier 31 has a grounded "+" input terminal, and a "−" input terminal for inputting the current signal. The capacitor 32 is disposed between the "−" input terminal and output terminal of the charge amplifier 31, and stores the inputted current signal, i.e., electric charge. The switch 33 is disposed between the "−" input terminal and output terminal of the charge amplifier 31, causes the capacitor 32 to store the electric charge when opened, and resets the storing of electric charge in the capacitor 32 when closed.

A switch 40 inputs to its input terminal the voltage signal outputted from the output terminal of the integrator circuit 30, and outputs this voltage signal to the output terminal when closed.

A variable capacity integrator circuit 50 inputs the voltage signal outputted from the output terminal of the switch 40. The variable capacity integrator circuit 50 comprises a capacitor 51, an amplifier 52, a variable capacity part 53, and a reset switch 54. The capacitor 51 is disposed between the output terminal of the switch 40 and the "−" input terminal of the amplifier 52. The "+" input terminal of the amplifier 52 is grounded, whereas the voltage signal from the capacitor 51 is inputted to the "−" input terminal. The variable capacity part 53 has a variable capacity, which is controllable; and is disposed between the "−" input terminal and output terminal of the amplifier 52, so as to store electric charge according to the inputted voltage signal. The switch 54 is disposed between the "−" input terminal and output terminal of the amplifier 52, causes the variable capacity part 53 to store the electric charge when opened, and resets the storing of electric charge in the variable capacity part 53 when closed. The variable capacity integrator circuit 50 inputs the voltage signal outputted from the output terminal of the switch 40, integrates it according to the capacity value of the variable capacity part 53, and outputs an integrated signal which is a result of integration.

A comparator 60 inputs to its "−" input terminal the integrated signal outputted from the variable capacity integrator circuit 50, with its "+" input terminal being set to a reference potential $V_{ref}$, compares the value of integrated signal with the reference potential $V_{ref}$ in terms of magnitude, and outputs a comparison result signal as the result of comparison.

A capacity control section 70 inputs the comparison result signal outputted from the comparator 60, outputs a capacity instruction signal C for controlling the capacity value of the variable capacity part 53 according to the comparison result signal, and outputs a first digital signal corresponding to the capacity value of the variable capacity part 53 when it is determined according to the comparison result signal that the value of integrated signal and the reference potential $V_{ref}$ coincide with each other at a predetermined resolution.

A readout section 80 inputs the first digital signal outputted from the capacity control section 70 and outputs a second digital signal corresponding to the first digital signal. The second digital signal indicates a value obtained when the offset value of the variable capacity integrator circuit 50 is eliminated from the value of the first digital signal. The readout section 80 is a memory element, for example, and inputs the first digital signal as an address, whereas data stored in the memory element at this address are outputted as the second digital signal. This second digital signal becomes an optical detection signal outputted from the solid-state imaging device in accordance with this embodiment.

A signal processing unit 100 is constituted by one set of the variable capacity integrator circuit 50, comparator 60, capacity control section 70, and readout section 80. The signal processing unit 100 has a CDS function for eliminating offset errors and an A/D-converting function for converting analog signals into digital signals.

Further provided is a timing control section (not depicted). The timing control section controls the respective switches 14 of the photodetectors $12_i$ (i=1 to L), the switch 20, the reset switch 33 of the integrator circuit 30, the switch 40, and the reset switch 54 of the variable capacity integrator circuit 50 so as to make them open and close at their predetermined timings, and also controls the operation of the capacity control section 70.

Figure 2:
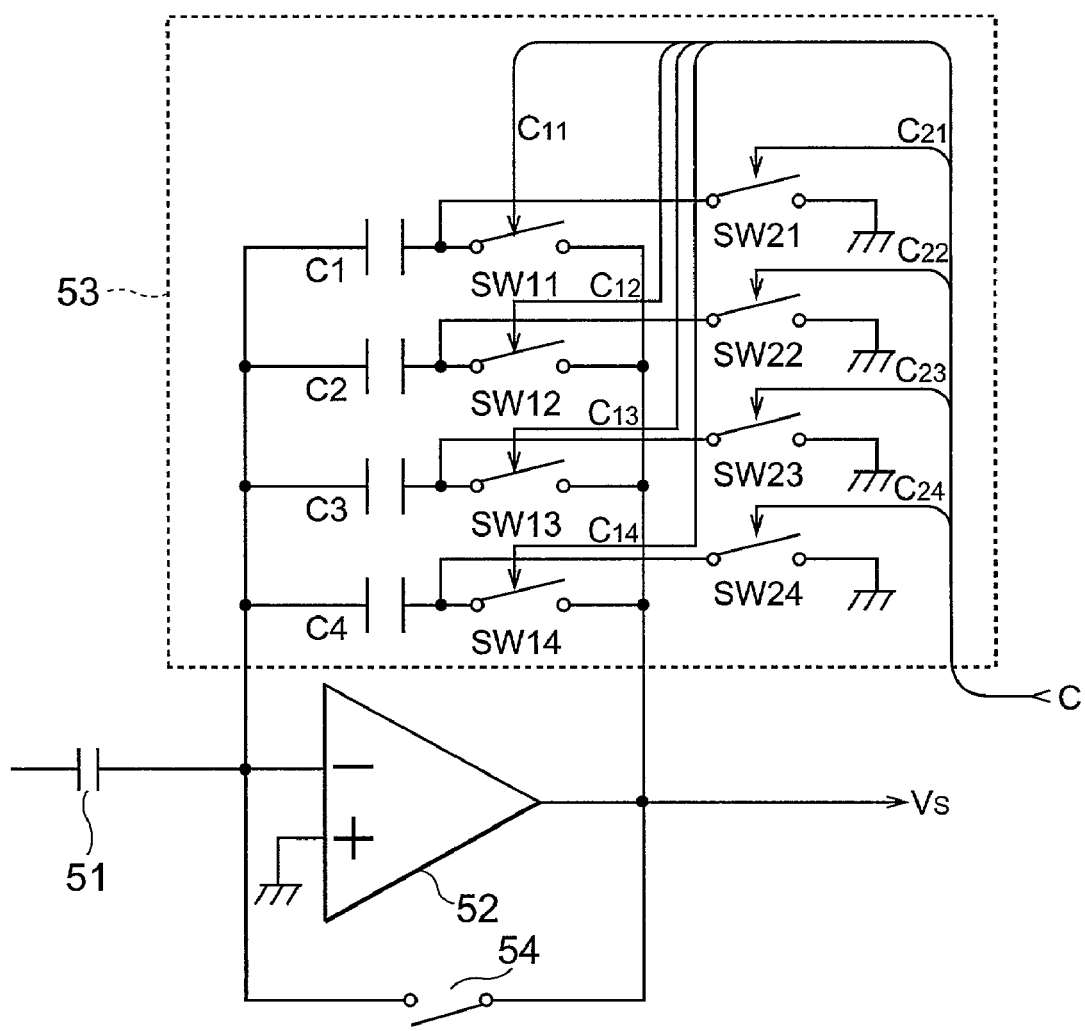
FIG. 2 is a schematic circuit diagram of a variable capacity integrator circuit.

FIG. 2 is a schematic circuit diagram of the variable capacity integrator circuit 50. This diagram shows a circuit configuration equipped with an A/D-converting function having a resolution of $1/2^4=1/16$, which circuit configuration will be used for the following explanation.

As shown in FIG. 2, the variable capacity part 53 comprises capacitors C1 to C4, switches SW11 to SW14, and switches SW21 to SW24. The capacitor C1 and the switch SW11 are cascaded to each other, and are disposed between the "–" input terminal and output terminal of the amplifier 52. The switch SW21 is disposed between the ground and the node between the capacitor C1 and switch SW11. The capacitor C2 and the switch SW12 are cascaded to each other, and are disposed between the "–" input terminal and output terminal of the amplifier 52. The switch SW22 is disposed between the ground and the node between the capacitor C2 and switch SW12. The capacitor C3 and the switch SW13 are cascaded to each other, and are disposed between the "–" input terminal and output terminal of the amplifier 52. The switch SW23 is disposed between the ground and the node between the capacitor C3 and switch SW13. The capacitor C4 and the switch SW14 are cascaded to each other, and are disposed between the "–" input terminal and output terminal of the amplifier 52. The switch SW24 is disposed between the ground and the node between the capacitor C4 and switch SW14.

The switches SW11 to SW14 open and close according to respective values of $C_{11}$ to $C_{14}$ of the capacity instruction signal C outputted from the capacity control section 70. The switches SW21 to SW24 open and close according to respective values of $C_{21}$ to $C_{24}$ of the capacity instruction signal C outputted from the capacity control section 70. The capacity values $C_1$ to $C_4$ of the capacitors C1 to C4 satisfy the following relationships:

$$C_1 = 2C_2 = 4C_3 = 8C_4$$

$$C_1 + C_2 + C_3 + C_4 = C_0$$

The solid-state imaging device in accordance with this embodiment operates as follows. FIGS. 3A to 3D are explanatory views for operations of the solid-state imaging device in accordance with this embodiment. In the following, it is assumed that each of the switches 20 and 40 is always closed.

First, in the solid-state imaging device in accordance with this embodiment, the respective switches 14 of the photodetectors $12_i$ (i=1 to L) are opened. The switch 33 of the integrator circuit 30 is closed, whereby the integrator circuit 30 is brought into its reset state. The switch 54 of the variable capacity integrator circuit 50 is closed, whereby the variable capacity integrator circuit 50 is brought into its reset state. Also, each of the switches SW11 to SW14 of the variable capacity integrator circuit 50 is closed, whereas each of the switches SW21 to SW24 of the variable capacity integrator circuit 50 is opened, whereby the capacity value of the variable capacity part 50 is set to $C_0$. In this state, the switch 33 of the integrator circuit 30 is opened, so as to enable integrating operations in the integrator circuit 30. At this point in time, an offset voltage which becomes a switching noise occurs in the integrator circuit 30 due to the action of parasitic capacity of the switch 33.

The switch 54 is opened after a slight delay of time ΔTd from the time when the switch 33 was opened. As a consequence, the voltage level at the output terminal of the integrator circuit 50 relatively varies, in the form having eliminated the offset level of the integrator circuit 30, by an amount corresponding to the photoelectric charge occurring thereafter. Namely, so-called CDS (Correlated Double Sampling) effect occurs.

Subsequently, only the switch 14 of the first photodetector $12_1$ in the vertical photodetective section 11 is closed. As a consequence, the electric charge stored in the photoelectric conversion device 13 of the photodetector $12_1$ due to the incident light so far is outputted as a current signal from the common signal output terminal of the vertical photodetective section 11, inputted to the integrator circuit 30 by way of the switch 20, and integrated by the integrator circuit 30, so as to be outputted as a voltage signal.

The voltage signal outputted from the integrator circuit 30 is inputted to the variable capacity integrator circuit 50 by way of the switch 40. The voltage signal inputted to the capacitor 51 of the variable capacity integrator circuit 50 changes by the amount of change in output voltage corresponding to the photoelectric charge in the integrator circuit 30, and an electric charge Q corresponding to the voltage change and the capacity value Co of the variable capacity part 53 flows into the variable capacity part 53 (see FIG. 3A).

Figure 3A:
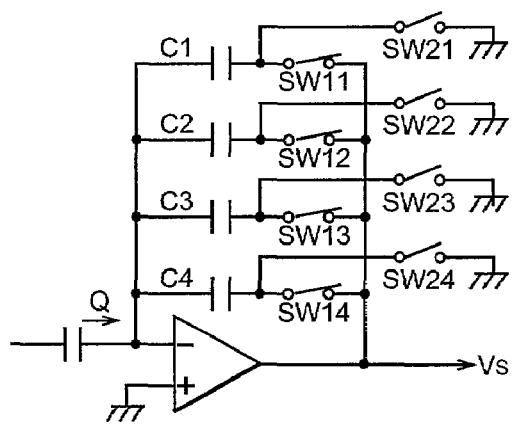
FIGS. 3A to 3D are explanatory views for operations of the solid-state imaging device in accordance with the first embodiment.
Figure 3B:
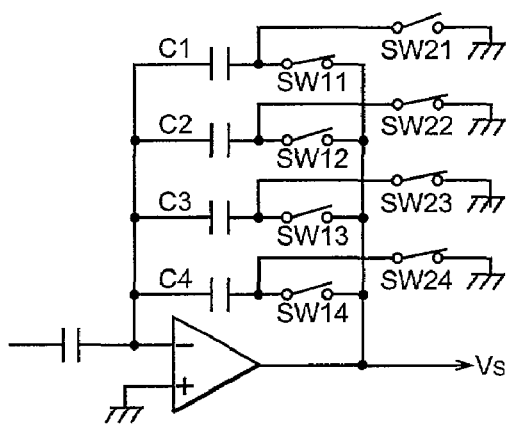

Subsequently, the capacity control section 70 opens the switches SW12 to SW14 of the variable capacity part 53 and then closes the switches SW22 to SW24 thereof (see FIG. 3B). As a result, the capacity value of the variable capacity part 53 becomes $C_1$, whereby the value $V_{sb}$ of integrated signal outputted from the variable capacity integrator circuit 50 is:

$$V_{sb} = Q/C_1$$

This integrated signal is inputted to the comparator 60, and its value is compared with a reference potential $V_{REF}$ in terms of magnitude.

Figure 3C:
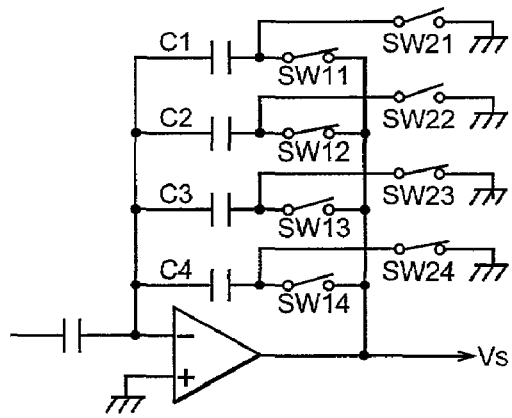

If $V_{sb} > V_{REF}$, then the capacity control section 70, in response to this result of comparison, opens the switch SW22 of the variable capacity part 53 and then closes the switch SW12 (see FIG. 3C). As a result, the capacity value of the variable capacity part 53 becomes $C_1+C_2$, whereby the value $V_{sc}$ of integrated signal outputted from the variable capacity integrator circuit 50 is:

$$V_{sc}=Q/(C_1+C_2)$$

This integrated signal is inputted to the comparator 60, and its value is compared with a reference potential $V_{REF}$ in terms of magnitude.

Figure 3D:
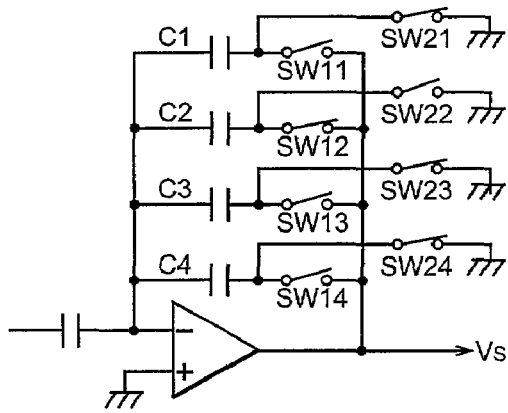

If $V_{sb}<V_{REF}$, then the capacity control section 70, in response to this result of comparison, opens the switches SW11 and SW22 of the variable capacity part 53 and then closes the switches SW12 and SW21 (see FIG. 3D). As a result, the capacity value of the variable capacity part 53 becomes $C_2$, whereby the value $V_{sd}$ of integrated signal outputted from the variable capacity integrator circuit 50 is:

$$V_{sd}=Q/C_2$$

This integrated signal is inputted to the comparator 60, and its value is compared with a reference potential $V_{REF}$ in terms of magnitude.

Subsequently, in a similar manner, a feedback loop constituted by the variable capacity integrator circuit 50, comparator 60, and capacity control section 70 repeatedly sets the capacity value of the variable capacity part 53 and compares the value of integrated signal with the reference potential $V_{ref}$ until the capacity control section 70 determines that the value of integrated signal coincides with the reference potential $V_{ref}$ at a predetermined resolution. After the capacity control for all the capacitors C1 to C4 in the variable capacity part 53 is thus completed, the capacity control section 70 outputs a digital signal corresponding to the final capacity value of the variable capacity part 53 toward the readout section 80.

In the readout section 80, the digital signal outputted from the capacity control section 70 is inputted as an address, and digital data stored in the memory element at this address are outputted as an optical detection signal of the solid-state imaging device in accordance with this embodiment.

At a point in time when the photoelectric conversion device 13 of the first photodetector $12_1$ in the vertical photodetective section 11 is assumed to have completely released its stored electric charge, the switch 14 of the photodetector $12_1$ is opened. After the optical detection signal corresponding to the first photodetector $12_1$ in the vertical photodetective section 11 is completely read out, the switch 33 of the integrator circuit 30 is closed, whereby the integrator circuit 30 is brought into its reset state. The switch 54 of the variable capacity integrator circuit 50 is closed, whereby the variable capacity integrator circuit 50 is brought into its reset state. Also, each of the switches SW11 to SW14 of the variable capacity integrator circuit 50 is closed, whereas each of the switches SW21 to SW24 is opened, whereby the capacity value of the variable capacity part 53 is set to $C_0$. In this state, the switch 33 of the integrator circuit 30 is opened, so as to enable integrating operations in the integrator circuit 30. Subsequently, as in the first photodetector $12_1$ in the vertical photodetective section 11, the optical detection signal corresponding to the second photodetector $12_2$ in the vertical photodetective section 11 is read out. The same applies to the i-th photodetector $12_i$ (i=3 to L) in the vertical photodetective section 11.

Figure 4:
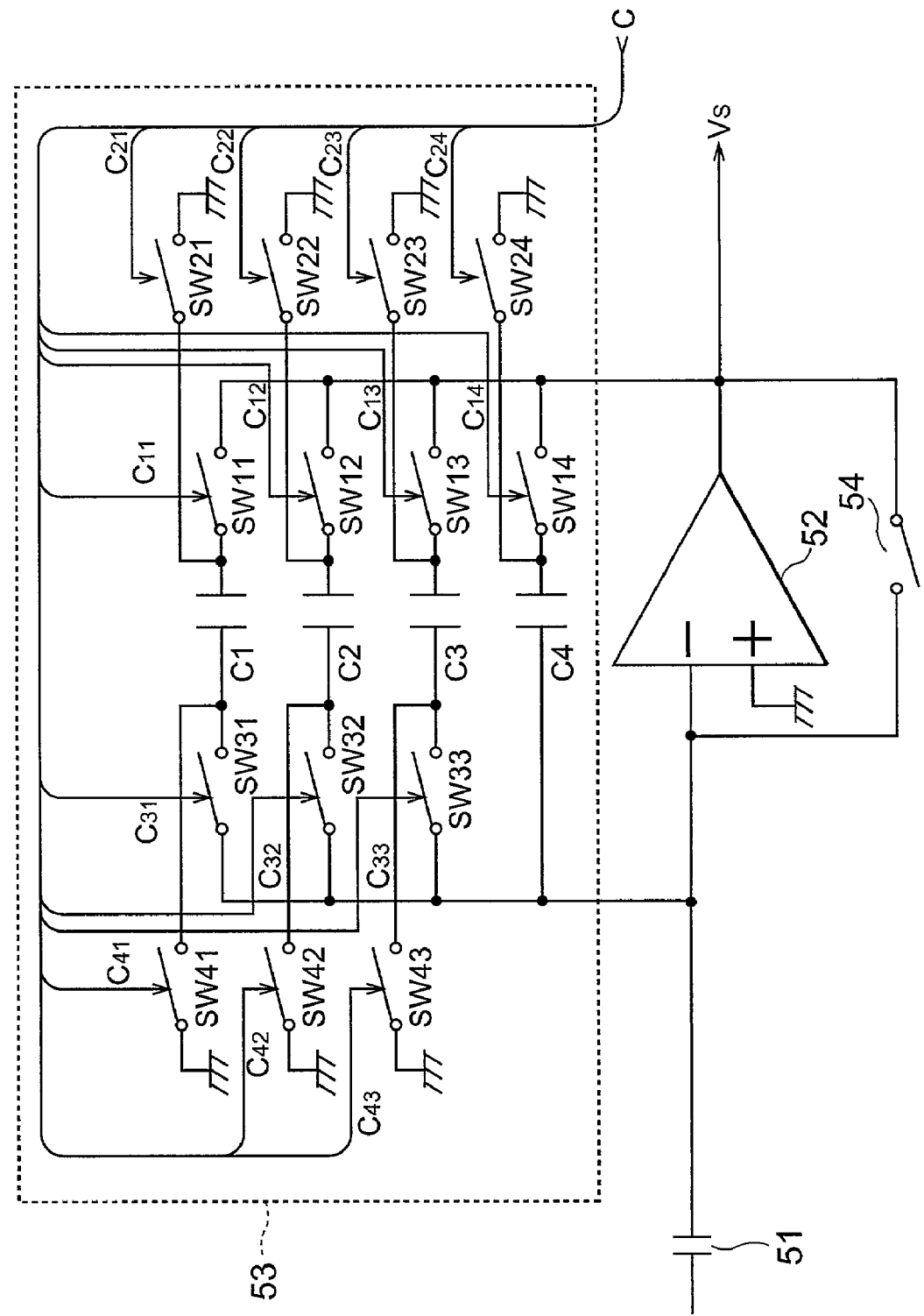
FIG. 4 is another schematic circuit diagram of the variable capacity integrator circuit.

Without being restricted to the circuit configuration shown in FIG. 2, the variable capacity part 53 of the variable capacity integrator circuit 50 may have other circuit configurations. FIG. 4 is another schematic circuit diagram of the variable capacity integrator circuit 50. When the variable capacity integrator circuit 50 has a circuit configuration such as that shown in this drawing, the solid-state imaging device in accordance with this embodiment can secure a favorable S/N ratio even if the electric charge stored in the photoelectric conversion device 13 is very small.

The variable capacity part 53 of this variable capacity integrator circuit 50 comprises capacitors C1 to C4, switches SW11 to SW14, switches SW21 to SW24, switches SW31 to SW33, and switches SW41 to SW43. The switch SW31, the capacitor C1, and the switch SW11 are successively cascaded to one another in this order and are disposed between the input terminal and output terminal of the amplifier 52. The switch SW21 is disposed between the ground and the node between the capacitor C1 and switch SW11. The switch SW41 is disposed between the ground and the node between the capacitor C1 and switch SW31. The same applies to the switch SW32, capacitor C2, switch SW12, switch SW22, and switch SW42. The same applies to the switch SW33, capacitor C3, switch SW13, switch SW23, and switch SW43. The capacitor C4 and the switch SW14 are cascaded to each other and are disposed between the "−" input terminal and output terminal of the amplifier 52. The switch SW24 is disposed between the ground and the node between the capacitor C4 and switch SW14.

The switches SW11 to SW14 open and close according to respective values of C11 to C14 of the capacity instruction signal C outputted from the capacity control section 70. The switches SW21 to SW24 open and close according to respective values of $C_{21}$ to $C_{24}$ of the capacity instruction signal C outputted from the capacity control section 70. The switches SW31 to SW33 open and close according to respective values of $C_{31}$ to $C_{33}$ of the capacity instruction signal C outputted from the capacity control section 70. The switches SW41 to SW43 open and close according to respective values of $C_{41}$ to $C_{43}$ of the capacity instruction signal C outputted from the capacity control section 70.

The solid-state imaging device having the variable capacity integrator circuit 50 with the circuit configuration shown in FIG. 4 operates as follows.

First, in the solid-state imaging device in accordance with this embodiment, the respective switches 14 of the photodetectors $12_i$ (i=1 to L) are opened. The switch 33 of the integrator circuit 30 is closed, whereby the integrator circuit 30 is brought into its reset state. The switch 40 is opened. The switch 54 of the variable capacity integrator circuit 50 is closed, so that the variable capacity integrator circuit 50 is brought into its reset state, and then the switch 54 is opened. Also, each of the switches SW11 to SW14 and the switches SW41 to SW43 of the variable capacity integrator circuit 50 is closed, whereas each of the switches SW21 to SW24 and the switches SW31 to SW33 is opened, whereby the capacity value of the variable capacity part 53 is set to $C_4$. In this state, the switch 33 of the integrator circuit 30 is opened, whereby integrating operations in the integrator circuit 30 are started.

Subsequently, only the switch 14 of the first photodetector $12_1$ in the vertical photodetective section 11 is closed. As a consequence, the electric charge stored in the photoelectric conversion device 13 in the photodetector $12_1$ due to the incident light so far is outputted as a current signal from the common signal output terminal of the vertical photodetective section 11, inputted to the integrator circuit 30 by way of the switch 20, and integrated by the integrator circuit 30, so as to be outputted as a voltage signal.

Then, the switch 40 is closed. As a consequence, the voltage signal outputted from the integrator circuit 30 is inputted to the variable capacity integrator circuit 50 by way of the switch 40. Since the switch 40 is closed, the voltage signal inputted to the capacitor 51 of the variable capacity integrator circuit 50 drastically changes, and the change of the voltage signal is inputted to the amplifier 52 from the capacitor 51. Namely, an electric charge Q corresponding to the change of inputted voltage signal and the capacity value $C_4$ of the variable capacity part 53 flows into the variable capacity part 53. At this time, the value $V_S$ of integrated signal outputted from the variable capacity integrator circuit 50 is:

$$V_S = Q/C_4$$

Subsequently, each of the switches SW41 to SW43 is opened, and then each of the switches SW31 to SW33 is closed, so as to cause the variable capacity part 53 to attain a capacity value of $C_0$. Even after such changes, relationships among voltages between both ends of the capacitors C1 to C3 do not change, so that no change occurs in the integrated signal value $V_S$, whereby the total electric charge occurring in the capacitors C1 to C4 is:

$$Q' = Q \cdot (C_0/C_4)$$

Namely, the electric charge stored in the variable capacity part 53 would be $(C_0/C_4)$ times that of the case shown in FIG. 2. Subsequently, as with the case of FIG. 2, the respective optical detection signals corresponding to the i-th photodetectors $12_i$ (i=1 to L) in the vertical photodetective section 11 are sequentially read out. As a consequence, a favorable S/N ratio can be secured even when the electric charge stored in the photoelectric conversion device 13 is extremely small.

Since the signal processing unit 100 constituted by one set of the variable capacity integrator circuit 50, comparator 60, capacity control section 70, and readout section 80 has a CDS function and an A/D-converting function, as in the foregoing, the solid-state imaging device in accordance with this embodiment can realize improvement in S/N ratio and suppression of offset errors with a simple circuit configuration.

Here, vertical photodetective sections 11, integrator circuits 30, and signal processing units 100 may be provided by the same number. However, as will be shown in subsequent embodiments, it is preferred that the number M1 of vertical photodetective section 11, the number M2 of integrator circuits 30, and the number M3 of signal processing units 100 have relationships of $$M3 \leq M2 \leq M1, M3 < M1$$

while selective connecting means for selectively connecting M1 sets of vertical photodetective sections 11, M2 sets of integrator circuits 30, and M3 sets of signal processing units 100 to one another be further provided, since, when they are mounted on the same chip, each of the increase in scale of the circuit mounted on the chip, the increase in chip area, and the increase in power consumption of the chip can be suppressed. Here, as the selective connecting means, the switches 20 and 40 are used.

(Second Embodiment)

Figure 5:
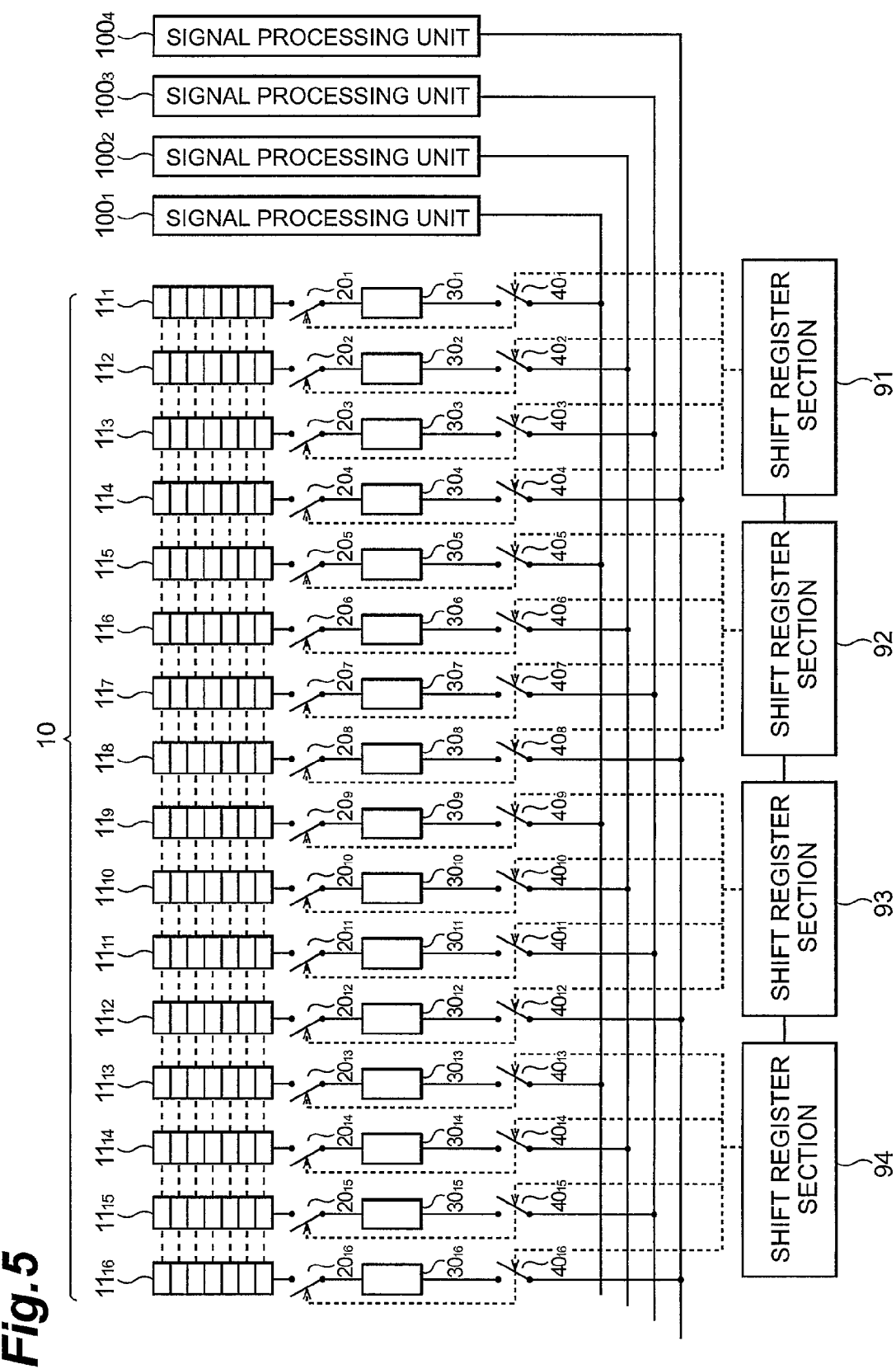
FIG. 5 is a block diagram of the solid-state imaging device in accordance with a second embodiment.

A second embodiment of the solid-state imaging device in accordance with the present invention will now be explained. FIG. 5 is a schematic block diagram of the solid-state imaging device in accordance with the second embodiment. The solid-state imaging device in accordance with this embodiment comprises a photodetective unit 10 in which vertical photodetective sections $11_j$ (j=1 to 16) are arranged, switches $20_j$ (j=1 to 16), integrator circuits $30_j$ (j=1 to 16), switches $40_j$ (j=1 to 16), shift register sections 91 to 94, and signal processing units $100_j$ (j= 1 to 4). Though the numbers of the vertical photodetective sections 11, switches 20, integrator circuits 30, and switches 40 are 16 each here, they may be provided by a greater number.

In the photodetective unit 10, photodetectors 12 are arranged two-dimensionally. Namely, in the photodetective unit 10, the photodetectors 12 are arranged in a first direction so as to form a vertical photodetective section $11_j$ (j=1 to 16), whereas such vertical photodetective sections $11_j$ are arranged in a second direction. Each of the vertical photodetective sections $11_j$ (j=1 to 16) has a configuration similar to the vertical photodetective section 11 of the first embodiment. Each of the integrator circuits $30_j$ (j=1 to 16) has a configuration similar to that of the integrator circuit 30 of the first embodiment. Each of the signal processing units $100_j$ (j=1 to 4) has a configuration similar to that of the signal processing unit 100 of the first embodiment, and comprises a variable capacity integrator circuit 50, a comparator 60, a capacity control section 70, and a readout section 80.

Each of the switches $20_j$ (j=1 to 16) corresponds to the switch 20 of the first embodiment, whereas each of the switches $40_j$ (j=1 to 16) corresponds to the switch 40 of the first embodiment. Also, the switches $20_j$ and $40_j$ (j=1 to 16) act as selective connecting means for selectively connecting the vertical photodetective sections $11_j$ (j= 1 to 16), integrator circuits $30_j$ (j=1 to 16), and signal processing units $100_j$ (j=1 to 4) to one another. Namely, the switches $20_j$ (j=1 to 16) are disposed between the respective common signal output terminals of the vertical photodetective sections $11_j$ and the respective input terminals of the integrator circuits $30_j$. Also, the switches $40_j$ (j=1, 5, 9, 13) are disposed between their corresponding output terminals of the integrator circuits $30_j$ and the input terminal of the signal processing unit $100_1$. The switches $40_j$ (j=2, 6, 10, 14) are disposed between their corresponding output terminals of the integrator circuits $30_j$ and the input terminal of the signal processing unit $100_2$. The switches $40_j$ (j=3, 7, 11, 15) are disposed between their corresponding output terminals of the integrator circuits $30_j$ and the input terminal of the signal processing unit $100_3$. The switches $40_j$ (j=4, 8, 12, 16) are disposed between their corresponding output terminals of the integrator circuits $30_j$ and the input terminal of the signal processing unit $100_4$.

The shift register sections 91 to 94 control their corresponding switches $20_j$ and $40_j$ (j=1 to 16), acting as selective connecting means, so as to make them open and close. Further provided is a timing control section (not depicted). The timing control section controls the respective switches 14 of the vertical photodetective sections $11_j$ (j=1 to 16), the respective reset switches 33 of the integrator circuits $30_j$ (j=1 to 16), and the respective reset switches 54 of the variable capacity integrator circuits 50 in the signal processing units $100_j$ (j=1 to 4) so as to make them open and close at their predetermined timings, and also controls operations of the respective capacity control sections 70 in the signal processing units $100_j$ (j=1 to 4) and shift register sections 91 to 94.

The solid-state imaging device in accordance with this embodiment operates as follows. First, the respective shift register sections 91 to 94 close only the switches $20_1$, $20_2$, $20_3$, and $20_4$ in the switches $20_j$ (j=1 to 16). Also, they close only the switches $40_1$, $40_2$, $40_3$, and $40_4$ in the switches $40_j$ (j=1 to 16). As a consequence, the vertical photodetective section $11_1$, switch $20_1$, integrator circuit $30_1$, switch $40_1$, and signal processing unit $100_1$ attain the configuration of FIG. 1 in accordance with the first embodiment. The vertical photodetective section $11_2$, switch $20_2$, integrator circuit $30_2$, switch $40_2$, and signal processing unit $100_2$ also attain the configuration of FIG. 1 in accordance with the first embodiment. The vertical photodetective section $11_3$, switch $20_3$, integrator circuit $30_3$, switch $40_3$, and signal processing unit $100_3$ also attain the configuration of FIG. 1 in accordance with the first embodiment. The vertical photodetective section $11_4$, switch $20_4$, integrator circuit $30_4$, switch $40_4$, and signal processing unit $100_4$ also attain the configuration of FIG. 1 in accordance with the first embodiment. As these four sets operate in parallel in a manner similar to the operation of the solid-state imaging device in accordance with the first embodiment, digital signals corresponding to the amounts of incident light detected by the individual photodetectors 12 in the vertical photodetective sections $11_j$ (j=1 to 4) are outputted from the signal processing units $100_k$ (k=1 to 4) at the same time.

Subsequently, the respective shift register sections 91 to 94 close only the switches $20_5$, $20_6$, $20_7$, and $20_8$ in the switches $20_j$ (j=1 to 16), and close only the switches $40_5$, $40_6$, $40_7$, and $40_8$ in the switches $40_j$ (j=1 to 16), whereby digital signals corresponding to the amounts of incident light detected by the individual photodetectors 12 in the vertical photodetective sections $11_j$ (j=5, 6, 7, 8) are outputted from the signal processing units $100_k$ (k=1 to 4) at the same time.

Further, the respective shift register sections 91 to 94 close only the switches $20_9$, $20_{10}$, $20_{11}$, and $20_{12}$ in the switches $20_j$ (j=1 to 16), and close only the switches $40_9$, $40_{10}$, $40_{11}$, and $40_{12}$ in the switches $40_j$ (j=1 to 16), whereby digital signals corresponding to the amounts of incident light detected by the individual photodetectors 12 in the vertical photodetective sections $11_j$ (j=9, 10, 11, 12) are outputted from the signal processing units $100_k$ (k=1 to 4) at the same time.

Then, the respective shift register sections 91 to 94 close only the switches $20_{13}$, $20_{14}$, $20_{15}$, and $20_{16}$ in the switches $20_j$ (j=1 to 16), and close only the switches $40_{13}$, $40_{14}$, $40_{15}$, and $40_{16}$ in the switches $40_j$ (j=1 to 16), whereby digital signals corresponding to the amounts of incident light detected by the individual photodetectors 12 in the vertical photodetective sections $11_j$ (j=13, 14, 15, 16) are outputted from the signal processing units $100_k$ (k= 1 to 4) at the same time.

As in the foregoing, the solid-state imaging device in accordance with this embodiment yields not only effects similar to those exhibited by the solid-state imaging device in accordance with the first embodiment, but also the following effects. Namely, in the conventional solid-state imaging device, one signal processing unit is provided for each vertical photodetective section on a chip, so that each signal processing unit must have a width identical to that of the vertical photodetective section for convenience of chip layout, whereby each signal processing unit has a unidirectionally long layout form. The resulting chip size has been large. In the solid-state imaging device in accordance with this embodiment, by contrast, the number of signal processing units is cut down, so that the total circuit scale is small, which reduces the chip size. Also, the degree of freedom in layout design of each signal processing unit increases, which also reduces the chip size. Further, as depicted, with respect to the arrangement of individual vertical photodetective sections in the photodetective unit, the individual signal processing units can be arranged in a side portion on an end side of the photodetective unit parallel to the first direction, whereby the chip size becomes smaller, and an image sensor having a form similar to a square can be realized.

(Third Embodiment)

Figure 6:
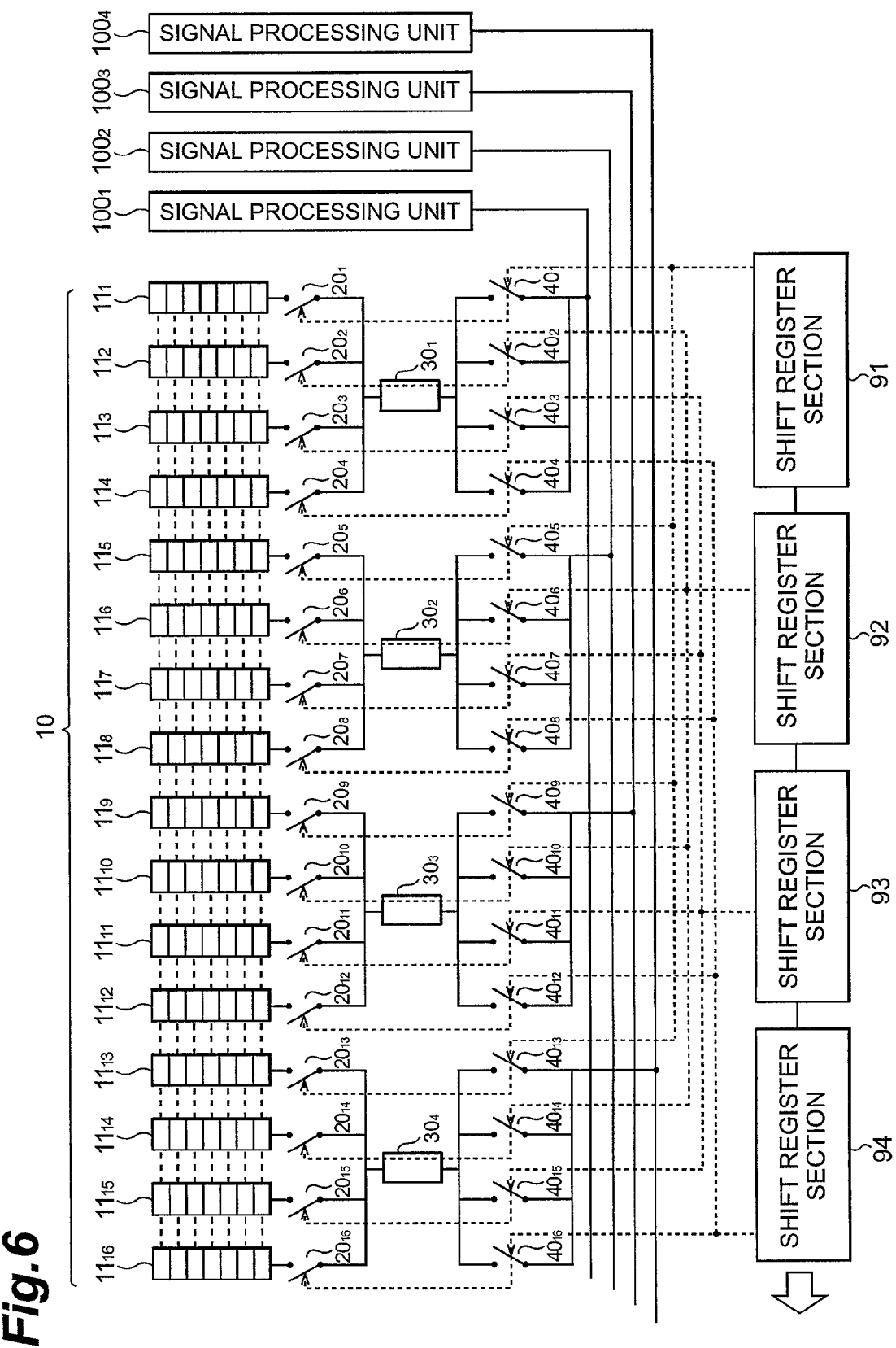
FIG. 6 is a block diagram of the solid-state imaging device in accordance with a third embodiment.

A third embodiment of the solid-state imaging device in accordance with the present invention will now be explained. FIG. 6 is a schematic block diagram of the solid-state imaging device in accordance with the third embodiment. The solid-state imaging device in accordance with this embodiment comprises a photodetective unit 10 in which vertical photodetective sections $11_j$ (j=1 to 16) are arranged, switches $20_j$ (j=1 to 16), integrator circuits $30_j$ (j=1 to 4), switches $40_j$ (j=1 to 16), shift register sections 91 to 94, and signal processing units $100_j$ (j= 1 to 4). Though the numbers of the vertical photodetective sections 11, switches 20, and switches 40 are 16 each, whereas the number of integrator circuits 30 is 4 here, they may be provided by greater numbers.

In the photodetective unit 10, photodetectors 12 are arranged two-dimensionally. Namely, in the photodetective unit 10, the photodetectors 12 are arranged in a first direction so as to form a vertical photodetective section $11_j$ (j=1 to 16), whereas such vertical photodetective sections $11_j$ are arranged in a second direction. Each of the vertical photodetective sections $11_j$ (j=1 to 16) has a configuration similar to the vertical photodetective section 11 of the first embodiment. Each of the integrator circuits $30_j$ (j=1 to 4) has a configuration similar to that of the integrator circuit 30 of the first embodiment. Each of the signal processing units $100_j$ (j=1 to 4) has a configuration similar to that of the signal processing unit 100 of the first embodiment, and comprises a variable capacity integrator circuit 50, a comparator 60, a capacity control section 70, and a readout section 80.

Each of the switches $20_j$ (j=1 to 16) corresponds to the switch 20 of the first embodiment, whereas each of the switches $40_j$ (j=1 to 16) corresponds to the switch 40 of the first embodiment. Also, the switches $20_j$ and $40_j$ (j=1 to 16) act as selective connecting means for selectively connecting the vertical photodetective sections $11_j$ (j= 1 to 16), integrator circuits $30_j$ (j=1 to 4), and signal processing units $100_j$ (j=1 to 4) to one another. Namely, the switches $20_j$ (j=1 to 4) are disposed between the respective common signal output terminals of the vertical photodetective sections $11_j$ and the input terminal of the integrator circuit $30_1$. The switches $20_j$ (j=5 to 8) are disposed between the respective common signal output terminals of the vertical photodetective sections $11_j$ and the input terminal of the integrator circuit $30_2$. The switches $20_j$ (j=9 to 12) are disposed between the respective common signal output terminals of the vertical photodetective sections $11_j$ and the input terminal of the integrator circuit $30_3$. The switches $20_j$ (j=13 to 16) are disposed between the respective common signal output terminals of the vertical photodetective sections $11_j$ and the input terminal of the integrator circuit $30_4$. The switches $40_j$ (j=1 to 4) are disposed between the output terminal of the integrator circuit $30_1$ and the input terminal of the signal processing unit $100_1$. The switches $40_j$ (j= 5 to 8) are disposed between the output terminal of the integrator circuit $30_2$ and the input terminal of the signal processing unit $100_2$. The switches $40_j$ (j=9 to 12) are disposed between the output terminal of the integrator circuit $30_3$ and the input terminal of the signal processing unit $100_3$. The switches $40_j$ (j=13 to 16) are disposed between the output terminal of the integrator circuit $30_4$ and the input terminal of the signal processing unit $100_4$.

The shift register sections 91 to 94 control their corresponding switches $20_j$ and $40_j$ (j=1 to 16), acting as selective connecting means, so as to make them open and close. Further provided is a timing control section (not depicted). The timing control section controls the respective switches 14 of the vertical photodetective sections $11_j$ (j=1 to 16), the respective reset switches 33 of the integrator circuits $30_j$ (j=1 to 4), and the respective reset switches 54 of the variable capacity integrator circuits 50 in the signal processing units $100_j$ (j=1 to 4) so as to make them open and close at their predetermined timings, and also controls operations of the respective capacity control sections 70 in the signal processing units $100_j$ (j=1 to 4) and shift register sections 91 to 94.

The solid-state imaging device in accordance with this embodiment operates as follows. First, the respective shift register sections 91 to 94 close only the switches $20_1$, $20_5$, $20_9$, and $20_{13}$ in the switches $20_j$ (j=1 to 16), and close only the switches $40_1$, $40_5$, $40_9$, and $40_{13}$ in the switches $40_j$ (j=1 to 16). As a consequence, the vertical photodetective section $11_1$, switch $20_1$, integrator circuit $30_1$, switch $40_1$, and signal processing unit $100_1$ attain the configuration of FIG. 1 in accordance with the first embodiment. Also, the vertical photodetective section $11_5$, switch $20_5$, integrator circuit $30_2$, switch $40_5$, and signal processing unit $100_2$ attain the configuration of FIG. 1 in accordance with the first embodiment. Also, the vertical photodetective section $11_9$, switch $20_9$, integrator circuit $30_3$, switch $40_9$, and signal processing unit $100_3$ attain the configuration of FIG. 1 in accordance with the first embodiment. Also, the vertical photodetective section $11_{13}$, switch $20_{13}$, integrator circuit $30_4$, switch $40_{13}$, and signal processing unit $100_4$ attain the configuration of FIG. 1 in accordance with the first embodiment. As these four sets operate in parallel in a manner similar to the operation of the solid-state imaging device in accordance with the first embodiment, digital signals corresponding to the amounts of incident light detected by the individual photodetectors 12 in the vertical photodetective sections $11_j$ (j=1, 5, 9, 13) are outputted from the signal processing units $100_k$ (k=1 to 4) at the same time.

Subsequently, the respective shift register sections 91 to 94 close only the switches $20_2$, $20_6$, $20_{10}$, and $20_{14}$ in the switches $20_j$ (j=1 to 16), and close only the switches $40_2$, $40_6$, $40_{10}$, and $40_{14}$ in the switches $40_j$ (j=1 to 16), whereby digital signals corresponding to the amounts of incident light detected by the individual photodetectors 12 in the vertical photodetective sections $11_j$ (j=2, 6, 10, 14) are outputted from the signal processing units $100_k$ (k=1 to 4) at the same time.

Further, the respective shift register sections 91 to 94 close only the switches $20_3$, $20_7$, $20_{11}$, and $20_{15}$ in the switches $20_j$ (j=1 to 16), and close only the switches $40_3$, $40_7$, $40_{11}$, and $40_{15}$ in the switches $40_j$ (j=1 to 16), whereby digital signals corresponding to the amounts of incident light detected by the individual photodetectors 12 in the vertical photodetective sections $11_j$ (j=3, 7, 11, 15) are outputted from the signal processing units $100_k$ (k=1 to 4) at the same time.

Then, the respective shift register sections 91 to 94 close only the switches $20_4$, $20_8$, $20_{12}$, and $20_{16}$ in the switches $20_j$ (j=1 to 16), and close only the switches $40_4$, $40_8$, $40_{12}$, and $40_{16}$ in the switches $40_j$ (j=1 to 16), whereby digital signals corresponding to the amounts of incident light detected by the individual photodetectors 12 in the vertical photodetective sections $11_j$ (j=4, 8, 12, 16) are outputted from the signal processing units $100_k$ (k=1 to 4) at the same time.

As in the foregoing, the solid-state imaging device in accordance with this embodiment yields not only effects similar to those exhibited by the solid-state imaging device in accordance with the first embodiment, but also the following effects. Namely, in the solid-state imaging device in accordance with this embodiment, the number of integrator circuits and signal processing units is cut down, so that the total circuit scale is small, which reduces the chip size. Also, the degree of freedom in layout design of each signal processing unit increases, which also reduces the chip size. Further, as depicted, with respect to the arrangement of individual vertical photodetective sections in the photodetective unit, the individual signal processing units can be arranged in a side portion on an end side of the photodetective unit parallel to the first direction, whereby the chip size becomes smaller, and an image sensor having a form similar to a square can be realized.

(Fourth Embodiment)

Figure 7:
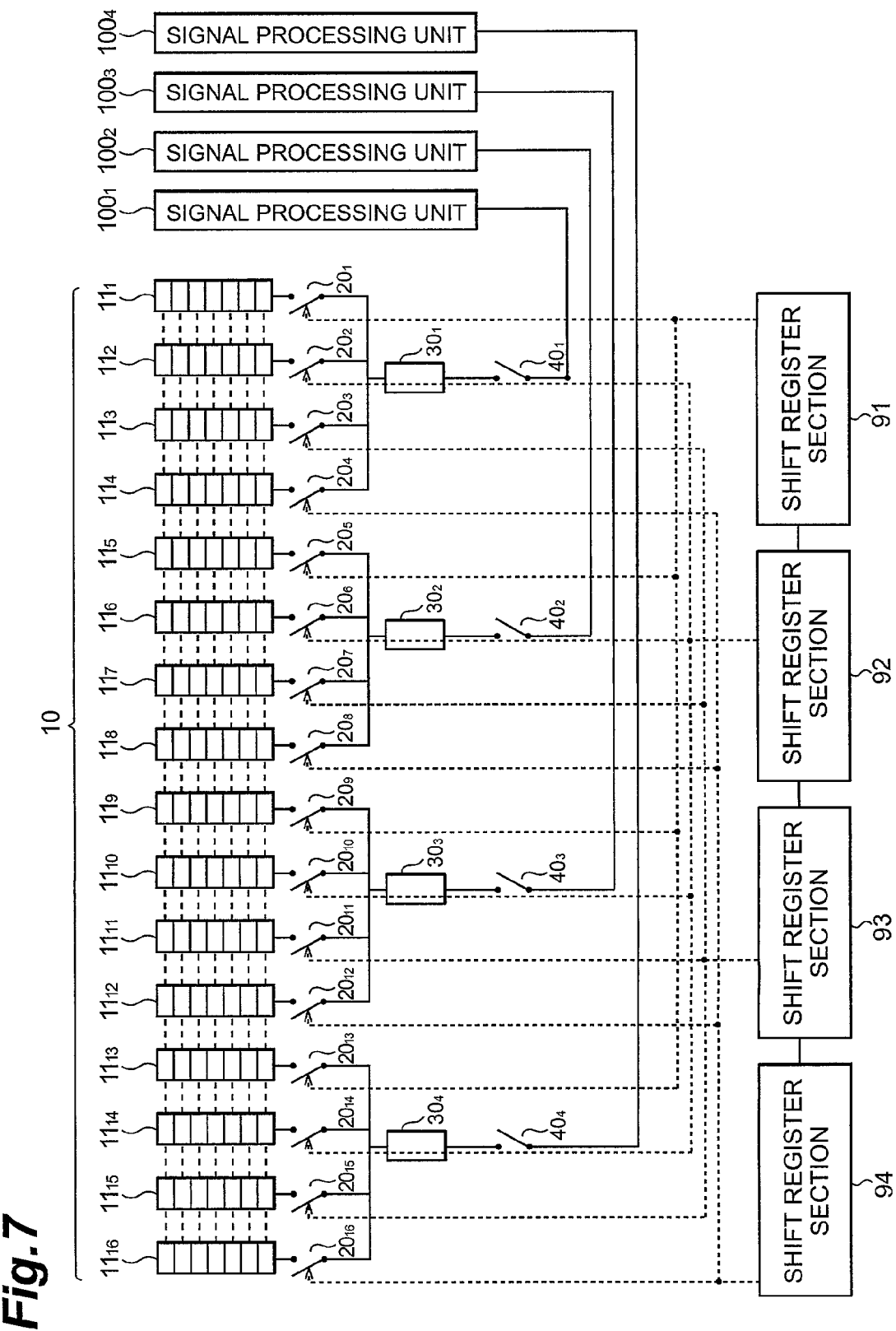
FIG. 7 is a block diagram of the solid-state imaging device in accordance with a fourth embodiment.

A fourth embodiment of the solid-state imaging device in accordance with the present invention will now be explained. FIG. 7 is a schematic block diagram of the solid-state imaging device in accordance with the fourth embodiment. The solid-state imaging device in accordance with this embodiment comprises a photodetective unit 10 in which vertical photodetective sections $11_j$ (j=1 to 16) are arranged, switches $20_j$ (j=1 to 16), integrator circuits $30_j$ (j=1 to 4), switches $40_j$ (j=1 to 4), shift register sections 91 to 94, and signal processing units $100_j$ (j= 1 to 4). Though the numbers of the vertical photodetective sections 11 and switches 20 are 16 each, whereas the numbers of integrator circuits 30 and switches 40 are 4 each here, they may be provided by greater numbers.

In the photodetective unit 10, photodetectors 12 are arranged two-dimensionally. Namely, in the photodetective unit 10, the photodetectors 12 are arranged in a first direction so as to form a vertical photodetective section $11_j$ (j=1 to 16), whereas such vertical photodetective sections $11_j$ are arranged in a second direction. Each of the vertical photodetective sections $11_j$ (j=1 to 16) has a configuration similar to the vertical photodetective section 11 of the first embodiment. Each of the integrator circuits $30_j$ (j=1 to 4) has a configuration similar to that of the integrator circuit 30 of the first embodiment. Each of the signal processing units $100_j$ (j=1 to 4) has a configuration similar to that of the signal processing unit 100 of the first embodiment, and comprises a variable capacity integrator circuit 50, a comparator 60, a capacity control section 70, and a readout section 80.

Each of the switches $20_j$ (j=1 to 16) corresponds to the switch 20 of the first embodiment, whereas each of the switches $40_j$ (j=1 to 4) corresponds to the switch 40 of the first embodiment. Also, the switches $20_j$ (j=1 to 16) and switches $40_j$ (j=1 to 4) act as selective connecting means for selectively connecting the vertical photodetective sections $11_j$ (j=1 to 16), integrator circuits $30_j$ (j=1 to 4), and signal processing units $100_j$ (j=1 to 4) to one another. Namely, the switches $20_j$ (j=1 to 4) are disposed between the respective common signal output terminals of the vertical photodetective sections $11_j$ and the input terminal of the integrator circuit $30_1$. The switches $20_j$ (j=5 to 8) are disposed between the respective common signal output terminals of the vertical photodetective sections $11_j$ and the input terminal of the integrator circuit $30_2$. The switches $20_j$ (j=9 to 12) are disposed between the respective common signal output terminals of the vertical photodetective sections $11_j$ and the input terminal of the integrator circuit $30_3$. The switches $20_j$ (j=13 to 16) are disposed between the respective common signal output terminals of the vertical photodetective sections $11_j$ and the input terminal of the integrator circuit $30_4$. The switches $40_j$ (j=1 to 4) are disposed between the respective output terminals of the integrator circuit $30_j$ and the respective input terminals of the signal processing units $100_j$.

The shift register sections 91 to 94 control their corresponding switches $20_j$ (j=1 to 16) and switches $40_j$ (j=1 to 4), acting as selective connecting means, so as to make them open and close. Further provided is a timing control section (not depicted). The timing control section controls the respective switches 14 of the vertical photodetective sections $11_j$ (j=1 to 16), the respective reset switches 33 of the integrator circuits $30_j$ (j=1 to 4), and the respective reset switches 54 of the variable capacity integrator circuits 50 in the signal processing units $100_j$ (j=1 to 4) so as to make them open and close at their predetermined timings, and also controls operations of the respective capacity control sections 70 in the signal processing units $100_j$ (j=1 to 4) and shift register sections 91 to 94.

The solid-state imaging device in accordance with this embodiment operates as follows. Here, when the number of the vertical photodetective sections 11 is 16 as shown in FIG. 7, each of the switches $40_j$ (j=1 to 4) may be left closed.

First, the respective shift register sections 91 to 94 close only the switches $20_1$, $20_5$, $20_9$, and $20_{13}$ in the switches $20_j$ (j=1 to 16). As a consequence, the vertical photodetective section $11_1$, switch $20_1$, integrator circuit $30_1$, switch $40_1$, and signal processing unit $100_1$ attain the configuration of FIG. 1 in accordance with the first embodiment. The vertical photodetective section $11_5$, switch $20_2$, integrator circuit $30_2$, switch $40_2$, and signal processing unit $100_2$ also attain the configuration of FIG. 1 in accordance with the first embodiment. The vertical photodetective section $11_9$, switch $20_3$, integrator circuit $30_3$, switch $40_3$, and signal processing unit $100_3$ also attain the configuration of FIG. 1 in accordance with the first embodiment. The vertical photodetective section $11_{13}$, switch $20_4$, integrator circuit $30_4$, switch $40_4$, and signal processing unit $100_4$ also attain the configuration of FIG. 1 in accordance with the first embodiment. As these four sets operate in parallel in a manner similar to the operation of the solid-state imaging device in accordance with the first embodiment, digital signals corresponding to the amounts of incident light detected by the individual photodetectors 12 in the vertical photodetective sections $11_j$ (j=1, 5, 9, 13) are outputted from the signal processing units $100_k$ (k=1 to 4) at the same time.

Subsequently, the respective shift register sections 91 to 94 close only the switches $20_2$, $20_6$, $20_{10}$, and $20_{14}$ in the switches $20_j$ (j=1 to 16), whereby digital signals corresponding to the amounts of incident light detected by the individual photodetectors 12 in the vertical photodetective sections $11_j$ (j=2, 6, 10, 14) are outputted from the signal processing units $100_k$ (k=1 to 4) at the same time.

Further, the respective shift register sections 91 to 94 close only the switches $20_3$, $20_7$, $20_{11}$, and $20_{15}$ in the switches $20_j$ (j=1 to 16), whereby digital signals corresponding to the amounts of incident light detected by the individual photodetectors 12 in the vertical photodetective sections $11_j$ (j=3, 7, 11, 15) are outputted from the signal processing units $100_k$ (k=1 to 4) at the same time.

Then, the respective shift register sections 91 to 94 close only the switches $20_4$, $20_8$, $20_{12}$, and $20_{16}$ in the switches $20_j$ (j=1 to 16), whereby digital signals corresponding to the amounts of incident light detected by the individual photodetectors 12 in the vertical photodetective sections $11_j$ (j=4, 8, 12, 16) are outputted from the signal processing units $100_k$ (k=1 to 4) at the same time.

As in the foregoing, the solid-state imaging device in accordance with this embodiment yields not only effects similar to those exhibited by the solid-state imaging device in accordance with the first embodiment, but also the following effects. Namely, in the solid-state imaging device in accordance with this embodiment, the number of integrator circuits, switches, and signal processing units is cut down, so that the total circuit scale is small, which reduces the chip size. Also, the degree of freedom in layout design of each signal processing unit increases, which also reduces the chip size. Further, as depicted, with respect to the arrangement of individual vertical photodetective sections in the photodetective unit, the individual signal processing units can be arranged in a side portion on an end side of the photodetective unit parallel to the first direction, whereby the chip size becomes smaller, and an image sensor having a form similar to a square can be realized.

The present invention can be utilized for pickupping two-dimensional light images and the like as a MOS type solid-state imaging device excellent in the efficiency of transferring electric charges generated upon incident light. In particular, since its signal processing unit including a variable capacity integrator circuit, a comparator, and a capacity control section has a CDS function and A/D-converting function, it is useful in that improvement in S/N ratio and suppression of offset errors can be realized with a simple circuit configuration.

What is claimed is:

1. A solid-state imaging device having:
   a photodetector including a photoelectric conversion device for converting an incident optical signal into a current signal and a switch for outputting said current signal to an output terminal;
   an integrator circuit for inputting and integrating the current signal outputted from the output terminal of said photodetector, so as to output a voltage signal to an output terminal thereof; and
   a signal processing unit for processing the voltage signal from said integrator circuit;
   said signal processing unit comprising:
   a variable capacity integrator circuit having a capacitor for inputting the voltage signal outputted from the output terminal of said integrator circuit and functioning as part of a Correlated Double Sampling (CDS) circuit, an amplifier for inputting to an input terminal the voltage signal outputted from said capacitor, a variable capacity part, disposed between the input and output terminals of said amplifier, having a variable capacity value, and a reset switch disposed between the input and output terminals of said amplifier, said variable capacity integrator circuit outputting from the output terminal of said amplifier an integrated signal having a value corresponding to a change of the voltage signal inputted to said capacitor;
   a comparator for inputting the integrated signal outputted from said variable capacity integrator circuit, comparing the value of said integrated signal with a reference value in terms of magnitude, and outputting a comparison result signal; and
   a capacity control section for inputting the comparison result signal outputted from said comparator, controlling the capacity value of said variable capacity part according to said comparison result signal, and outputting a first digital signal corresponding to the capacity value of said variable capacity part when it is determined according to said comparison result signal that the value of said integrated signal and said reference value coincide with each other at a predetermined resolution.

2. A solid-state imaging device according to claim 1, wherein said signal processing unit further comprises a readout section for inputting the first digital signal outputted from said capacity control section and outputting a second digital signal corresponding to said first digital signal.

3. A solid-state imaging device according to claim 1, wherein said photodetectors are arranged in a first direction, while respective output terminals of the switches thereof are connected to each other so as to form a vertical photodetective section with a common signal output terminal, M1 sets of said vertical photodetective sections being arranged in a second direction so as to constitute a photodetective unit;

said solid-state imaging device further comprising:

M2 sets of said integrator circuits (where $M2 \leqq M1$);

M3 sets of said signal processing units (where $M3 \leqq M2$, $M3 < M1$); and selective connecting means for selectively connecting M1 sets of said vertical photodetective sections, M2 sets of said integrator circuits, and M3 sets of said signal processing units to one another.

4. A solid-state imaging device according to claim 3, wherein said signal processing units are disposed in a side portion on an end side of said photodetective unit parallel to said first direction.

* * * * *